United States Patent [19]

Takahiro et al.

[11] Patent Number: 5,170,131
[45] Date of Patent: Dec. 8, 1992

[54] DEMODULATOR FOR DEMODULATING DIGITAL SIGNAL MODULATED BY MINIMUM SHIFT KEYING AND METHOD THEREFOR

[75] Inventors: Chihara Takahiro, Shiki; Miyazaki Masao, Nara; Ohta Tomozo, Ikoma, all of Japan

[73] Assignee: Sharp Kabushiki Kaisha, Osaka, Japan

[21] Appl. No.: 787,514

[22] Filed: Nov. 4, 1991

[30] Foreign Application Priority Data

Nov. 7, 1990 [JP] Japan ................................. 2-301338

[51] Int. Cl.⁵ .............................................. H03D 3/00
[52] U.S. Cl. ................................... 329/300; 329/302; 375/90
[58] Field of Search ................... 329/300, 302; 375/45, 375/47, 88, 90

[56] References Cited

U.S. PATENT DOCUMENTS 4,359,692  11/1982  Ryan ..................................... 329/302
4,384,357   5/1983  deBuda et al. ..................... 375/90 X

FOREIGN PATENT DOCUMENTS 0070664   4/1983  Japan ..................................... 375/90

OTHER PUBLICATIONS

Ishizuka et al., IEEE Transactions on Communications, vol. COM-28 No, 6, 850-857 (Jun. 1980).

Primary Examiner—Robert J. Pascal
Attorney, Agent, or Firm—David G. Conlin

[57] ABSTRACT

Disclosed is a demodulation circuit for demodulating a modulated signal obtained by minimum shift keying. The demodulation circuit includes two synchronous detection circuits for detecting the modulated signal synchronously with two signals having the phases different from each other by 90°, respectively, a circuit for discriminating the amplitude of the output signal of one of the synchronous detection circuits to convert the output signal into a rectangular wave having two logical levels, and a circuit for sampling the rectangular wave signal in synchronization with a clock signal having a frequency corresponding to one-bit duration of the digital data. Both of two signals having the phases different by 90° from each other, all of which are necessary for the synchronous detection, and the clock signal are generated based on a signal ($Vt(\theta)$) obtained by multiplying the output signal of the one of the synchronous detection circuits and the output signal of the other of the synchronous detection circuits.

12 Claims, 5 Drawing Sheets

DEMODULATOR FOR DEMODULATING DIGITAL SIGNAL MODULATED BY MINIMUM SHIFT KEYING AND METHOD THEREFOR

BACKGROUND OF THE INVENTION

1. Field of the Invention

The present invention relates generally to modulators and a modulation method, and more particularly, to modulators for modulating MSK (Minimum Shift Keying) signals and a method therefor.

2. Description of the Background Art

Modulation techniques for converting a signal to be transmitted into a signal having a pattern adaptable to a transmission medium and for restoring the transmitted signal to the original pattern are important in the field of communication. In recent years, digital data is often used as a signal to be transmitted. Various digital modulation systems have been proposed to modulate such digital data for transmission in the field of radio communication. The MSK is one of such digital modulation systems.

MSK is included in continuous-phase FSK (Frequency Shift Keying), one of the frequency modulation techniques. The continuous-phase frequency shift keying is a frequency modulation method in which the frequency of a modulated wave is switched between predetermined values with the change of a carry frequency being continues at the switching. The continuous-phase FSK with modulation index of 0.5 is called MSK system. An instantaneous frequency of a modulated wave is ordinarily switched between two frequencies, one called a mark frequency fm and the other called a space frequency fs.

More specifically, the frequency of the modulated wave is switched to the mark frequency fm and the space frequency fs corresponding to the logical values "1" or "0" of the digital data to be modulated, respectively, on the MSK system. According to the frequency modulation technique with the amplitude of a modulated wave fixed, a signal modulated (MSK signal) by such MSK is less affected by non-linear distortion at the time of transmission.

For demodulating the MSK signal, a mark frequency component and a space frequency component are extracted from the MSK signal to perform synchronous detection by using the extracted mark frequency component or space frequency component, thereby detecting the change of the instantaneous frequency of the modulated wave from the carrier frequency, which is the so-called deviated frequency-locking synchronous detecting scheme.

FIG. 4 is a block diagram showing the structure of a conventional MSK signal demodulation circuit for demodulating an MSK signal by using the deviated frequency-locking synchronous detecting scheme. The structure and operation of a conventional MSK signal demodulation circuit will be described in the following with reference to FIG. 4.

With reference to FIG. 4, an MSK signal received at an input terminal 10 is applied to detectors 11 and 12. The detectors 11 and 12 quadrature-detect the MSK signal in synchronism with the output of a voltage-controlled carrier oscillation 15.

More specifically, the detector 11 multiplies the MSK signal by the output of the voltage-controlled carrier oscillator 15 and the detector 12 multiplies the MSK signal by the output of a 90° phase shifter 16. The 90° phase shifter 16 shifts the phase of the output of the voltage-controlled carrier oscillator 15 by 90°. The MSK signal is detected in synchronism with each of the two signals differing in phase from each other by 90°.

The voltage-controlled carrier oscillator 15 is a variable output frequency oscillator using the central value of the output frequency as a mark frequency fm or a space frequency fs. It is assumed in the following that the center frequency of the output of the voltage-controlled carrier oscillator 15 is a mark frequency fm.

The MSK signal applied to the input terminal 10 is represented as the function Y (t) of time t expressed by the following equation.

$$Y(t) = \cos[(\omega c + ui \cdot \omega d) \cdot t + \phi_0] \tag{1}$$

In the above-described equation (1) $\omega c$ denotes a carrier angular frequency, ed denotes an angular frequency of $\frac{1}{4}$ of a clock angular frequency, ui denotes a digital value ($\pm 1$) corresponding to either the logical value "0" or "1" of the original digital data before modulation and $\phi_1$ denotes the initial phase (0 or $\phi$). One bit of the original data before modulation has a fixed duration. The MSK signal, which is a modulated wave, therefore includes a frequency component with one cycle of one-bit duration, that is, a clock component. $\omega d$ is $\frac{1}{4}$ of the angular frequency of the clock component. Since generality of the MSK signal is not lost even with the initial phase $\phi_0 = 0$, it is assumed in the following that $Y(t) = \cos[(\omega c + ui \cdot \omega d) \cdot t]$.

With fc denoting a carrier frequency and fd denoting $\frac{1}{4}$ of the frequency of the clock component, the mark frequency fm can be represented as a sum of the two frequencies, that is, as fc + fd. The relation of $\omega m = \omega c + \omega d$ is established among a carrier angular frequency $\omega c$, an angular frequency $\omega d$ of $\frac{1}{4}$ of a clock angular frequency and a mark angular frequency $\omega m$. The mark angular frequency $\omega m$ is an angular frequency of a modulated wave (mark signal) transmitted corresponding to the digital value of +1 and represents the angular frequency of the mark frequency component. The output of the voltage-controlled carrier oscillator 15 can be therefore be represented as the function C (t) of time t expressed by the following equation.

$$\begin{aligned} C(t) &= \cos(\omega m \cdot t - \theta) \\ &= \cos[(\omega c + \omega d) \cdot t - \theta] \end{aligned} \tag{2}$$

In the above equation (2), $\theta$ denotes a phase error. A correct detection output can be obtained from the detector 11 only when the phase $((\omega c + ui \cdot \omega d) \cdot t)$ of the MSK signal coincides with the phase $(\omega m \cdot t - \theta)$ of the output of the voltage-controlled carrier oscillator 15. That is, the output signal I of the detector 11 is represented as the variable I (t) of time t expressed by the following equation.

$$I(t) = \frac{1}{2}\cos[(ui - 1) \cdot \omega d \cdot t + \theta] \tag{3}$$

The 90° phase shifter 16 shifts the phase of the output of the voltage-controlled carrier oscillator 15 by 90°. The output of the 90° phase shifter 16 is therefore represented as sin ($\omega m \cdot t - \theta$), the function of time t. A correct detection output can be obtained from the detector 12 only when the phase $((\omega c + ui \cdot \omega d) \cdot t)$ of the MSK signal coincides with the phase $(\omega m \cdot t - \theta)$ of the output signal of the 90° phase shifter 16. That is, the output signal Q of the detector 12 is represented as the function Q (t) of time t expressed by the following equation.

$$Q(t) = \tfrac{1}{2} \sin [(ui-1)\cdot \omega d \cdot t + \theta] \quad (4)$$

As described above, the output signal I of the detector 11 and the output signal Q of the detector 12 have phases different by 90° from each other. In FIG. 2, the output signal I of the detector 11 and the output signal Q of the detector 12 are multiplied together by a multiplier 13. The output signal of the multiplier 13 will be represented as the function $V_t(\theta)$ of time t and phase error $\theta$, which function is expressed by the following equation.

$$V_t(\theta) = \tfrac{1}{8} \sin [2(ui-1)\cdot \omega d \cdot t + 2\theta] \quad (5)$$

The output signal $V_t(\theta)$ of the multiplier 13 is applied to a loop filter 14. The loop filter 14 removes an alternating current component of the output signal $V_t(\theta)$ of the multiplier 13 to extract a direct current component only. That is, the loop filter 14 functions to remove the term of the angular frequency $\omega d$ at the right side of the equation (5). The output signal of the loop filter 14 will therefore be represented as the function $V(\theta)$ of phase error $\theta$ only, which is expressed by the following equation.

$$V(\theta) = \tfrac{1}{8} \sin (2\theta) \quad (6)$$

The output signal of the loop filter 14 is applied to the voltage-controlled carrier oscillator 15 as a control voltage.

As described above, the voltage-controlled carrier oscillator 15 is constantly supplied with a control voltage having a level proportional to the phase error $\theta$, from the carrier component of the mark signal.

The voltage-controlled carrier oscillator 15 controls its output frequency in response to the control voltage. When the control voltage is higher than 0 V, the voltage-controlled carrier oscillator 15 increases its output frequency to bring the phase error $\theta$ near to 0. Conversely, when the control voltage is lower than 0 V, the voltage-controlled carrier oscillator 15 reduces its output frequency to bring the phase error $\theta$ near to 0. With the control voltage of 0 V, the voltage-controlled carrier oscillator 15 operates to prevent the output frequency from changing. When the phase error $\theta$ is 0 or $\pi$, therefore, the output frequency of the voltage-controlled carrier oscillator 15 is locked to a fixed value.

The demodulated digital data with the phase error $\theta$ of 0 is inverse to that with the phase error $\theta$ of $\phi$. Differential coding is therefore performed on the transmission side when generating digital data before being modulated. The differential coding is a method of coding by which such operation is performed as establishing that $y_k = y_{k-1} \oplus x_k$ ($\oplus +$ is an exclusive OR symbol) at all times, with $x_k$ representing data of k-th input data and $y_k$ representing the data of k-th output bit in a coder for generating the digital data to be modulated. The MSK signal obtained by modulating the digital data generated by the differential coding will therefore attain the original data before the differential coding without fail as a result of the reverse processing, performed at the demodulating circuit, of this differential coding irrespective of the phase error $\theta$ of 0 and $\pi$.

As can be seen from the equations (3) and (4), the output signals of the detectors 11 and 12 with the phase error $\theta$ of 0 will be respectively represented as the functions I (t) and Q (t) of time t expressed by the following equations.

In a case where a digital value ui = +1:

$$I(t) = \tfrac{1}{2}$$

$$Q(t) = 0$$

In a case where a digital value ui = −1:

$$I(t) = \tfrac{1}{2} \cos (2\omega d \cdot t)$$

$$Q(t) = \tfrac{1}{2} \sin (2\omega d \cdot t)$$

FIG. 5 is a waveform diagram showing the relationships between the output signals I and Q of the detectors 11 and 12 and the frequency of the MSK signal applied to the input terminal 10 and between the output signals I and Q and the digital data before being modulated. In this case, the phase error $\theta$ is 0.

It is assumed that the MSK signal with such a frequency change as shown in line (b) of FIG. 5 is applied to the input terminal 10. The digital value ui designated by the MSK signal takes −1 and +1 corresponding respectively to a space frequency fs and a mark frequency fm as shown in line (a) of FIG. 5. In this case, with the phase error $\theta$ of 0, the output signal I of the detector 11 becomes a fixed direct current signal in the periods T2, T3 and T6 wherein the MSK signal has the mark frequency fm and becomes an alternating current signal in the periods T1, T4 and T5 wherein the MSK signal has a space frequency fs as shown in waveform (c) FIG. 5. Similarly, the output signal Q of the detector 12 becomes a fixed direct current signal in the periods T2, T3 and T6 and becomes an alternating current signal out of phase, by 90°, from the output signal I of the detector 11 in the periods T1, T4 and T5. Each of the periods T1-T6 has a duration allotted to one-bit data of the MSK signal, that is, a duration equivalent to one cycle of the clock component. Each frequency of the output signal I of the detector 11 and the output signal Q of the detector 12 in each of the periods T1, T4 and T5 is half the clock frequency.

As described above, the MSK signal applied to the input terminal 10 has a mark frequency component reproduced by a so-called Costas-loop constituted by the detectors 11 and 12, the multiplier 13, the loop filter 14, the voltage-controlled carrier oscillator 15 and the 90° phase shifter 16. The output signals I and Q of the detectors 11 and 12 which have detected the MSK signal in synchronism with the reproduced mark frequency component are applied to the multiplier 13 for reproducing the carrier component of the mark signal and are also applied to an amplitude discrimination unit 17 and a square circuit 19.

The amplitude discrimination unit 17 converts the signal I into a signal having such a rectangular wave as shown in waveform (e) of FIG. 5 by determining whether the amplitude of the output signal I of the detector 11 is equal to or above the level indicated by the broken line in waveform (c) of FIG. 5. The rectangular wave is applied to a timing determining unit 18.

The timing determining unit 18 converts the rectangular wave into a digital signal having a logical value of "0" or "1" ((g) in FIG. 5) by sampling the rectangular wave voltage from the amplitude discrimination unit 17 in response to a clock signal ((f) in FIG. 5) applied from a clock reproduction circuit 20 in a constant timing. The converted digital signal is decoded to the original digital data before being modulated by a differential decoding circuit 30.

The differential decoding circuit 30 includes a symbol delay circuit 31 and an exclusive OR circuit 32. The digital signal output from the timing determining unit 18 is directly applied to the exclusive OR circuit 32, while the same is delayed by one bit by the delay circuit 31 and applied to the exclusive OR circuit 32. The exclusive OR circuit therefore outputs an exclusive OR of the data of the adjacent two bits of the digital signal output from the timing determining unit 18. As a result, every time the timing determining unit 18 outputs one-bit data, a demodulated data output terminal 40 receives one-bit data having a logical value equivalent to an exclusive OR of the one-bit data and the one-bit data previously output from the timing determining unit 18. In other words, the digital signal reproduced from the MSK signal is subjected to the reverse processing of the differential coding performed at the time of transmission by the differential decoding circuit 30, to be decoded to the original data before being subjected to the differential coding.

The square circuit 19 squares the output signal Q of the detector 12 and applies the squared signal to the clock reproduction circuit 20. The output signal Q of the detector 12 is expressed by the equation (4) as the function Q (t) of time t. The output signal Q of the square circuit 19, with the phase error $\theta$ of 0, will be expressed by the following equation as the function $Q^2$ (t) of time t accordingly.

$$Q^2(t) = \frac{1}{2}[1 - \cos\{2(ui-1)\cdot\omega d \cdot t\}] \quad (7)$$

The output signal of the square circuit 19, with the digital data ui of $-1$, will be expressed by the following equation as the function $Q^{2'}$(t) of time t accordingly.

$$Q^{2'}(t) = \frac{1}{2}\{1 - \cos(4\omega d \cdot t)\} \quad (8)$$

With $\omega d$ representing the angular frequency of $\frac{1}{4}$ of the clock angular frequency, the alternating current component included in the output signal of the square circuit 19, with the digital value ui of $-1$, includes the clock frequency component only. That is, the square circuit 19 extracts the clock component included in the MSK signal by squaring the output signal Q of the detector 12.

The clock reproduction circuit 20 includes a PLL (Phase Locked Loop) constituted by a voltage-controlled clock oscillator 21, a phase detector 22 and a loop filter 23.

The phase detector 22 phase-detects the output signal of the voltage-controlled clock oscillator 21 by using the reference signal extracted by the square circuit 19 as a clock component. As a result, the phase detector 22 outputs a voltage having a direct current level proportional to a phase difference between the clock component extracted by the square circuit 19 and the output signal of the voltage-control clock oscillator 21. The output voltage of the phase detector 22 is smoothed by the loop filter 23 and applied to the voltage-controlled clock oscillator 21 as a control voltage.

The voltage-controlled clock oscillator 21 controls its own output frequency in response to the control voltage. The application of the output voltage of the phase detector 22 to the voltage-controlled clock oscillator 21 through the loop filter 23 locks the output signal of the voltage-controlled clock oscillator 21 to a signal having the same phase and the same frequency as those of the clock component extracted by the square circuit 19.

In this way, the clock reproduction circuit 20 reproduces a clock signal having a frequency corresponding to the duration of one bit of the digital data before being modulated, based on the clock component in the MSK signal extracted by the square circuit 19. The clock signal reproduced by the clock reproducing circuit 20 is applied to the timing determining unit 18. The duration of one bit of the digital signal output from the timing determining unit 18 becomes the same as that before being modulated as a result.

With the digital data ui = +1, the square circuit 19 outputs 0 and the phase detector 22 consequently loses a reference signal. With no reference signal applied to the phase detector 22, the voltage-controlled clock oscillator 21 is supplied with no control voltage to prevent locking of the frequency and the phase of the output signal of the voltage-controlled clock oscillator 21. The time period from the application of the reference signal to the phase detector 22 to the signal output of the voltage-controlled clock oscillator 21 in response to the reference signal, which period is the loop response speed of the clock reproduction circuit 20, is set to be sufficiently longer than the time period from the application of one-bit MSK signal to the input terminal 10 to the application of the subsequent one-bit MSK signal to the input terminal 10, that is, the data transmission speed by the MSK signal. In addition, such digital data as is transmitted through radio communication is usually scrambled at the transmission side so as to have the same frequency of the occurrence of the two logical values "0" and "1". It is therefore understood that it is not highly possible that the digital value ui of the MSK signal continuously attains +1 for a long time period. Thus, once the frequency and the phase of the output signal of the voltage-controlled clock oscillator 21 are locked in response to the digital value ui attaining $-1$, the frequency and the phase of the output signal of the voltage-controlled clock oscillator 21 do not deviate from those locked even if the digital value ui attains +1 thereafter.

The above-described circuit operation demodulates the MSK signal applied to the input terminal 10 to the original digital data which is output from the decoded data output terminal 40.

Although the foregoing is the description where the center frequency of the output of the voltage-controlled carrier oscillator 15 is a mark frequency fm, the same circuit operation can demodulate the MSK signal to the original data also in a case where the center frequency of the output of the voltage-controlled carrier oscillator 15 is a space frequency fs. A low-pass filter can be added in the subsequent stage to the detectors 11 and 12. The provision of a low-pass filter removes a small amount of undesired high frequency component included in the output signal I of the detector 11 and the output signal Q of the detector 12.

As described in the foregoing, a conventional MSK signal demodulation circuit includes a square circuit (the square circuit 19 in FIG. 4) to extract a clock frequency component included in an MSK signal. FIG. 6 is a circuit diagram showing an example of a common circuit for use as the square circuit.

The square circuit is constituted by such an absolute value circuit as shown in FIG. 6a, for example. The absolute value circuit outputs the positive full-wave rectification waveform $|e_i|$ of an input signal $e_i$. The absolute value circuit includes two operation amplifiers OP1 and OP2 and two diodes D1 and D2 in general. The diode D1 is provided between the output end and the inversion input terminal of the operation amplifier OP1. The diode D2 is provided between the output and the inversion input terminal of the operation amplifier OP1 through a resistor R3.

The input signal $e_i$ is applied to the inversion input terminal of the operation amplifier OP1 through a resistor R1. With the input signal $e_i$ of having the negative polarity applied, the diode D1 conducts to produce a signal of the opposite polarity to that of the input signal $e_i$ at a node n between the resistor R3 and the diode D2. Conversely, with the input signal $e_i$ having the positive polarity applied, the diode D1 becomes non-conductive, while the potential at the node n is clamped at the forward threshold voltage of the diode 2. A half-wave rectification waveform is obtained at the node n, which waveform is the inversion of the phase of the component having the negative polarity of input signal $e_i$. The half-wave rectification waveform is applied to the inversion input terminal of the operation amplifier OP2 through a resistor R4. The inversion input terminal of the operation amplifier OP2 also receives an input signal $e_i$ through a resistor R2. The operation amplifier OP2 with a resistor R5 connected between the inversion input terminal and the output terminal constitutes an adder for adding a signal applied to the inversion input terminal through the resistor R2 and a signal applied to the inversion input terminal through the resistor R4 at a ratio of 1 to 2. The output end of the operation amplifier OP2 therefore obtains a waveform with the input signal $e_i$ and the above-described half-wave rectification waveform added at a ratio of 1 to 2, that is, it obtains the full-wave rectification waveform of the input signal $e_i$.

In addition, the square circuit can be constituted simply by a multiplier 190 as shown in FIG. 6b. In this case, the signal $e_i$ to be squared is used as both input signals IN1 and IN2 of the multiplier 190. The multiplier 190 multiplies the two input signals IN1 and IN2 together to obtain a signal $(e_i)^2$ which is the square of the input signal $e_i$, as the output signal of the multiplier 190.

As described above, the conventional demodulation circuit for demodulating an MSK signal includes a square circuit to extract a clock frequency component included in the MSK signal. Such an absolute value circuit as shown in FIG. 6a and such a multiplier as shown in FIG. 6b are generally used for the square circuit.

The absolute value circuit including two operation amplifiers, two diodes and many resistance elements, used as a square circuit, requires the increased number of components of the entire demodulation circuit. The cost of the demodulation circuit is increased accordingly.

With a multiplier used as a square circuit, while the number of components of the multiplier itself does not lead to a large increase in the number of components of the entire demodulation circuit, various additional circuits are required because of the operation characteristic of the multiplier. For example, since an output signal of the multiplier includes an undesired higher harmonic component, a low-pass filter or a bandpass filter is provided for suppressing the higher harmonic component in the succeeding stage to the multiplier in general. Some multipliers attaining a low level output depending on an input signal require an amplifier to be provided in a succeeding stage to the multiplier for amplifying the output signal. The multiplier, for use as a square circuit, also requires such additional circuits, thereby increasing the number of components of the entire demodulation circuit.

SUMMARY OF THE INVENTION

An object of the present invention is to provide a demodulation device for an MSK signal with a reduced number of circuit components.

Another object of the present invention is to reduce the cost of a demodulation device for an MSK signal.

A further object of the present invention is to provide a demodulation device for an MSK signal requiring a reduced number of circuit components and reduced cost.

Still further object of the present invention is to provide a demodulation device for an MSK signal with no square circuit included therein.

Still further object of the present invention is to provide a demodulation device for an MSK signal at a low cost including less number of components than and having the same performance as a conventional device.

Still further object of the present invention is to provide a demodulation device for an MSK signal having the performance equivalent to that of a conventional device and including no square circuit.

In order to achieve the above-described objects, the demodulation device according to the present invention includes a first detection circuit for detecting an MSK signal in synchronism with a first signal, a second detection circuit for detecting the MSK signal in synchronism with a second signal having a phase different by 90° from that of the first signal, a multiplication circuit for multiplying the output of the first detection circuit by the output of the second detection circuit, a clock signal generation circuit for generating a clock signal having a phase synchronized with that of a signal component included in the MSK signal and having the frequency corresponding to one-bit duration of the digital data before being modulated in response to the multiplication output of the multiplication circuit, and a circuit for reproducing the digital data before being modulated from the output of the first detection circuit in response to the clock signal generated by the clock signal generation circuit.

In order to achieve the above-described objects, the method of demodulating an MSK signal according to the present invention includes the steps of detecting the MSK signal in synchronism with the first signal, detecting the MSK signal in synchronism with the second signal having a phase different by 90° from that of the first signal, multiplying the signal detected in synchronism with the first signal and the signal detected in synchronism with the second signal together, generating a clock signal having a phase synchronized with that of a signal component included in the MSK signal and having a frequency corresponding to one-bit duration of the digital data before modulated in response to the multiplied signal, and reproducing digital data before being modulated in response to the multiplied signal from the signal detected in synchronism with the first signal in response to the generated clock signal.

In the demodulation device and the demodulation method according to the present invention, the output of the multiplication circuit required for controlling the first and the second signals necessary for quadrature synchronous detection of the MSK signal is used for generating a clock signal necessary for reproducing the digital signal before being modulated from the output of the first detection circuit. On the other hand, the clock signal is generated based on a signal obtained by squaring the output of the second detection circuit in a conventional MSK signal demodulation device.

As described in the foregoing, the clock signal necessary for reproducing the digital data before being modulated from the output of the first detection circuit is generated based on the output of the multiplication circuit multiplying the output of the first detection circuit by the output of the second detection circuit according to the present invention. The present invention therefore requires no circuit for squaring the output of the second detection circuit, which circuit is necessary for a conventional MSK signal demodulation circuit. As a result, the number of components of the MSK signal demodulation device can be reduced, while simplifying the circuit structure. Such reduction in the number of the components enables the MSK signal demodulation device to be manufactured at a low cost and the simplification of the circuit structure makes the MKS signal demodulation device more suitable to be made into an integrated circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
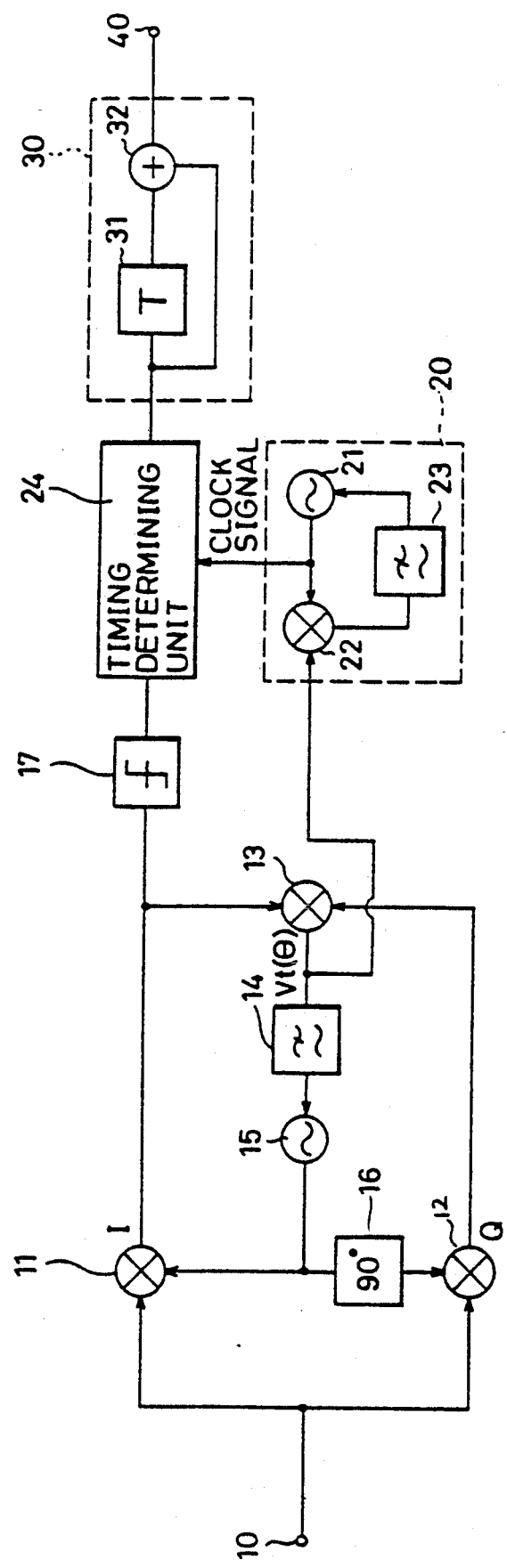
FIG. 1 is a block diagram showing the structure of an MSK signal demodulation circuit according to one embodiment of the present invention.

FIG. 1 is a block diagram showing the structure of an MSK signal demodulation circuit according to one embodiment of the present invention.

Figure 4:
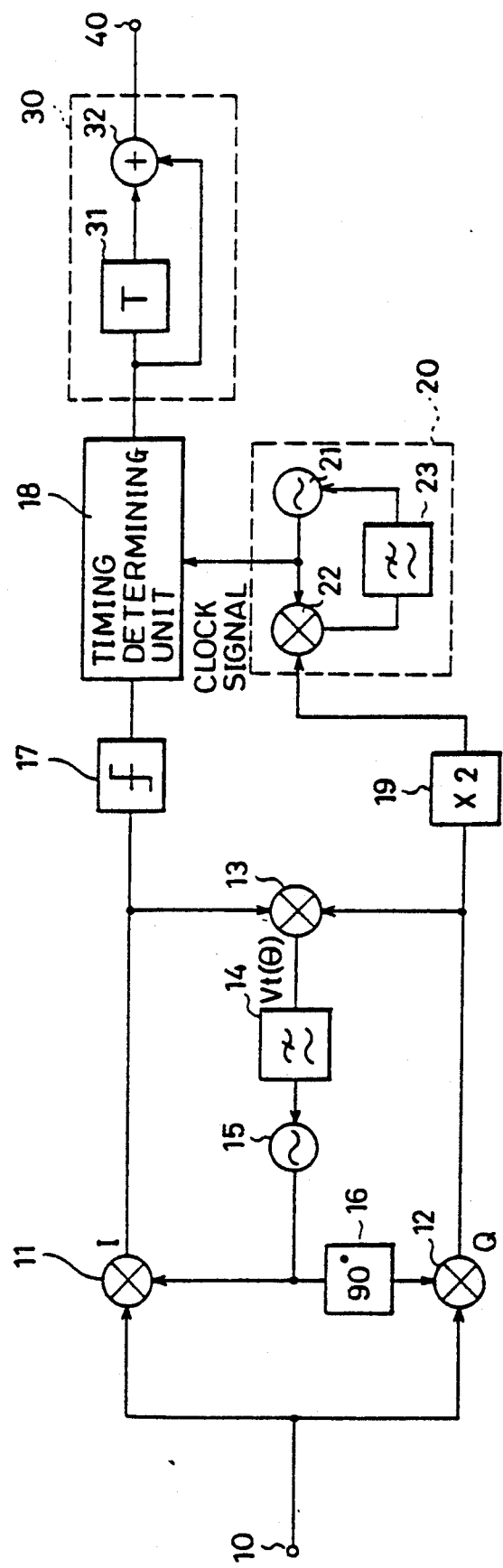
FIG. 4 is a block diagram showing the structure of a conventional MKS signal demodulation circuit.
Figure 5:
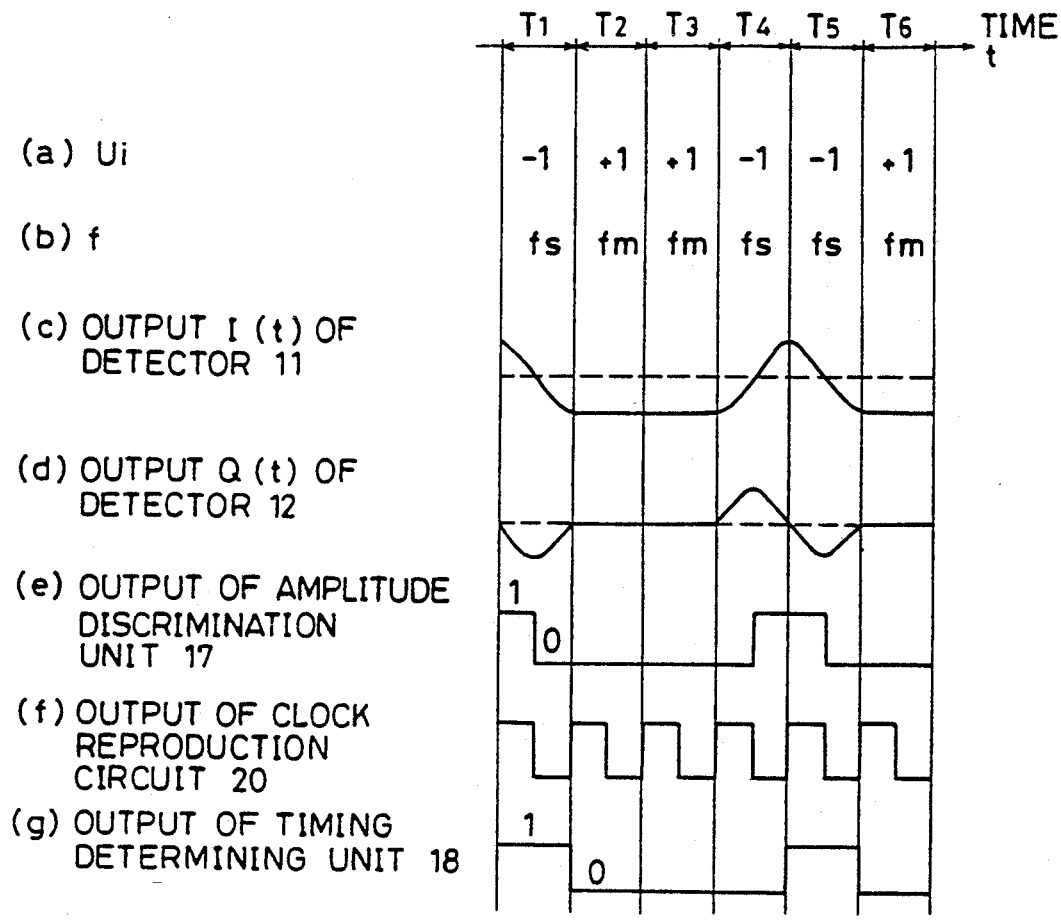
FIG. 5 is a waveform diagram explaining the operation of the MSK signal demodulation circuit shown in FIG. 4.
Figure 6A:
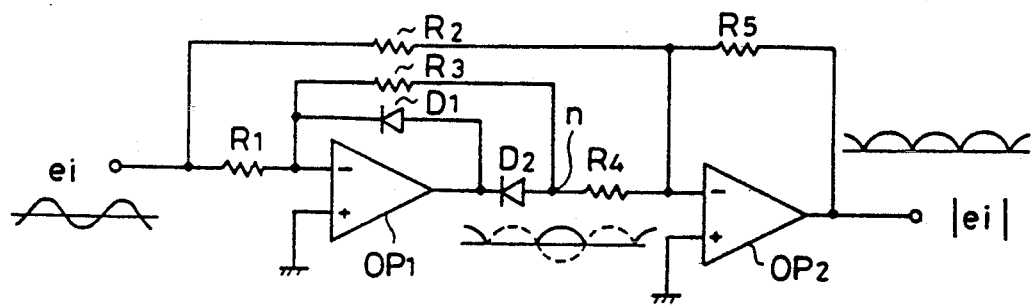
FIGS. 6a and 6b are diagrams showing specific examples of the square circuit shown in FIG. 4.
Figure 6B:
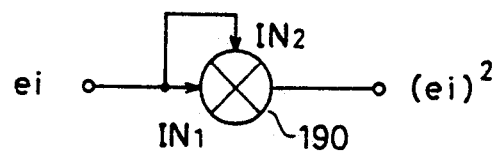

With reference to FIG. 1, the MSK signal demodulation circuit does not include the square circuit 19 provided in the conventional MSK signal demodulation circuit shown in FIG. 4 and the output of the multiplier 13, in place of the output of the square circuit 19 of FIG. 4, is applied to the phase detector 22 in the clock reproduction circuit 20. The structure and the operation of the other part of the MSK signal demodulation circuit are the same as those of the conventional MSK signal demodulation circuit shown in FIG. 4, of which description is not repeated. The timing determining unit 24 has a digital processing function for shifting the phase of the rectangular wave applied from the amplitude discrimination unit 17 by 90° in addition to the function that the timing determining unit 18 shown in FIG. 4 has.

Figure 3:
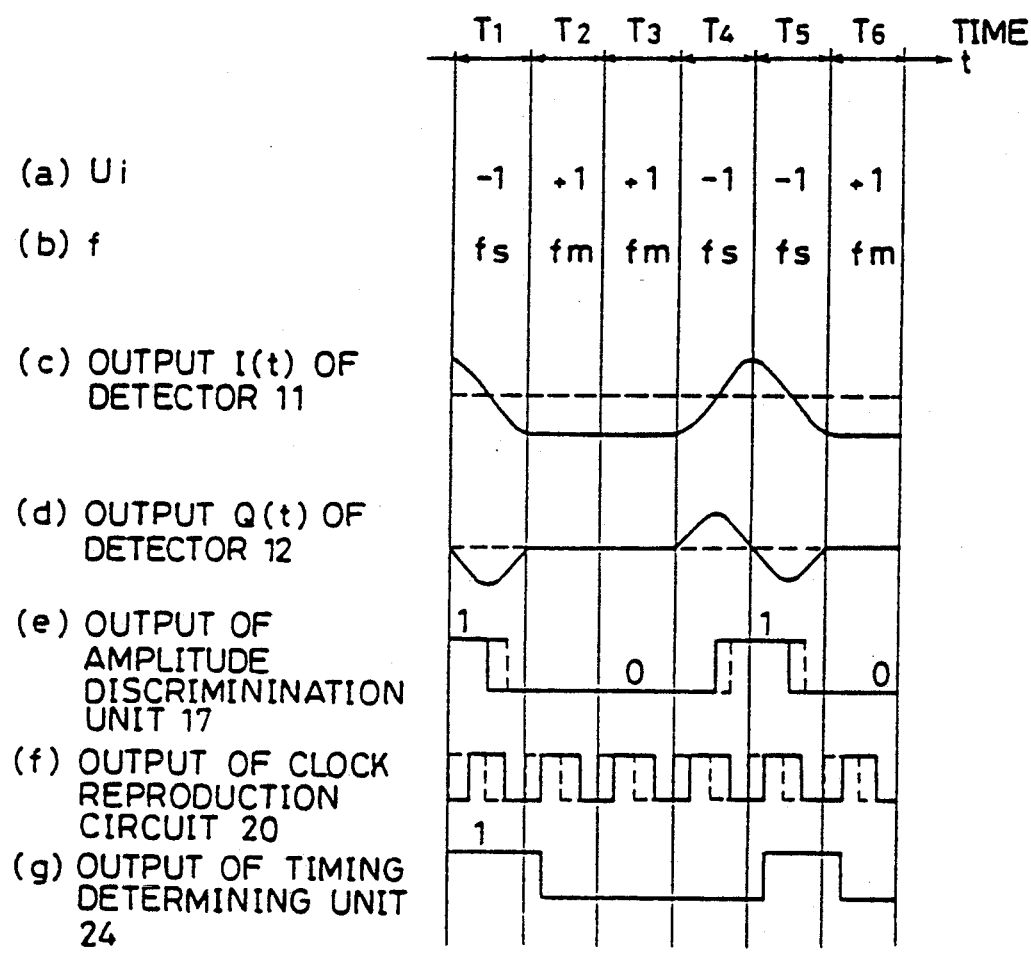
FIG. 3 is a waveform diagram explaining the operation of the MSK signal demodulation circuits of FIGS. 1 and 2.

With reference to FIG. 3, the operation of the MSK signal demodulation circuit will be described mainly with respect to the portions different from those of the conventional device.

According to the present embodiment, the output signal I of the detector 11 and the output signal Q of the detector 12, the output signal of the amplitude discrimination unit 17, the output signal of the clock reproduction circuit 20 and the output signal of the timing determining unit 24 have such waveforms as shown in (c), (d), (e), (f) and (g) of FIG. 3, respectively, on condition that the digital value ui of the MSK signal applied to the input terminal 10 changes, for example, as shown in (a) of FIG. 3.

Like the description of the related art, it is assumed in the following description that the MSK signal applied to the input terminal 10 is represented as the function Y (t) of time t expressed by the above equation (1) and the center frequency of the output signal of the voltage-controlled carrier oscillator 15 is a mark frequency fm. The output of the voltage-controlled carrier oscillator 15 is represented as the function C (t) of time t expressed by the above-described equation (2).

With the MSK signal expressed by the above-described equation (1) applied to the input terminal 10, the detector 11 outputs the signal I expressed by the equation (3) as the function I (t) of time t and the detector 12 outputs the signal Q expressed by the following equation (4) as the function Q (t) of time t (see waveforms (c) and (d) of FIG. 3).

$$I(t) = \tfrac{1}{2} \cos[(ui-1)\cdot \omega d\cdot t + \theta] \quad (3)$$

$$Q(t) = \tfrac{1}{2} \sin[(ui-1)\cdot \omega d\cdot t + \theta] \quad (4)$$

The multiplier 13 outputs a signal expressed by the following equation (5) as the function $V_t(\theta)$ of time t and phase error $\theta$ in response thereto.

$$\begin{aligned} V_t(\theta) &= I(t) + Q(t) \\ &= \tfrac{1}{4}\sin[2(ui-1)\cdot \omega d\cdot t + 2\theta] \end{aligned} \quad (5)$$

The output signal of the multiplier 13 is fed back to the voltage-controlled carrier oscillator 15 through the loop filter 14, so that the phase error $\theta$ becomes 0 to lock the output frequency of the voltage-controlled carrier oscillator 15 to the mark frequency fm. As a result, the output signal of the multiplier 13 will be expressed by the following equation (9) as the function V (t) of time t only.

$$V(t) = \tfrac{1}{4}\sin[2(ui-1)\cdot \omega d\cdot t] \quad (9)$$

In the present embodiment, the output signal of the multiplier 13 is applied to the phase detector 22. The phase detector 22 receives the output signal of the multiplier 13 as a reference signal to detect the phase of the output signal of the voltage-controlled clock oscillator 21. As is clear from the above-described equation (9), with the MSK signal having the digital value ui of +1 applied to the input terminal 10, the output signal of the multiplier 13 attains 0 while with the MSK signal having the digital value ui of −1 applied to the input terminal 10, the output signal of the multiplier 13 will be expressed by the following equation as the function V' (t) of time t only.

$$V'(t) = -\tfrac{1}{8} \sin(4\omega d \cdot t) \quad (10)$$

The multiplier 13 extracts the clock frequency component (sin (4ωd·t)) included in the MSK signal when the digital value ui is −1. Upon the application of the output signal of the multiplier 13 to the phase detector 22 as a reference signal, the voltage-controlled clock oscillator 21, the phase detector 22 and the loop filter 23 operate in the same manner as the conventional device to lock the output signal of the voltage-controlled clock oscillator 21 to the frequency and the phase of the clock frequency component extracted by the multiplier 13 when the digital value ui is −1.

With the digital value ui of +1, the multiplier 13 outputs "0" and consequently the phase detector 22 loses the reference signal. Meanwhile, the digital data to be transmitted is scrambled on the transmission side to have the same frequency of the occurrence of the two logical values 0 and 1 as described above. A time period is therefore relatively short in practice when the digital value ui of the MSK signal continuously attains +1. In addition, the loop response speed of the clock reproduction circuit 20 is set to be sufficiently lower than the data transmission speed by the MSK signal. As a result, there occurs no deviation of the output signal of the voltage-controlled block oscillator 21 from the once locked frequency and phase in the period when the multiplier 13 outputs 0, with the digital value ui of the +1. The timing determining unit 24 is constantly supplied with a clock signal having the same frequency and phase as that of the clock frequency component extracted by the multiplier 13 when the digital value ui is −1.

In the present embodiment, the reference signal received by the phase detector 22 is a clock frequency component (sin (4 ωd·t)) extracted by the multiplier 13 and having a phase shifted by 90° from the clock frequency component (cos (4ωd·t)) extracted by the square circuit 19 in the conventional MSK signal demodulation circuit shown in FIG. 4. The phase of the clock signal (indicated by the solid line in (f) of FIG. 3) applied from the clock reproduction circuit 20 to the timing determining unit 24 is accordingly shifted by 90° from the phase of the clock signal (indicated by the broken line in (f) of FIG. 3) applied from the clock reproduction circuit 20 to the timing determining unit 18 in the conventional MSK signal demodulation circuit.

The timing determining unit 24 shifts the phase of the rectangular wave (indicated by the solid line in (e) of FIG. 3) applied from the amplitude discrimination unit 17 by 90° as indicated by the broken line in (e) of FIG. 3. Then, the timing determining unit 24 converts the rectangular wave into a digital signal (see waveform (g) of FIG. 3) having a logical value switched in the same timing as that of the switching of the digital value ui of MSK signal by sampling the rectangular wave voltage with the shifted phase in synchronization with the clock signal from the clock reproduction circuit 20. As a result, the output terminal 40 outputs the digital data before being modulated of the MSK signal applied to the input terminal 10.

As described in the foregoing, the MSK signal demodulation circuit according to the present invention is structured such that the output signal of the multiplier 13 is applied to the clock reproduction circuit 20 as a reference signal in consideration of the clock frequency component (sin (4ωd·t)) included in the signal obtained by multiplying the output signal I of the detector 11 by the output signal Q of the detector 12. This structure eliminates the necessity of the square circuit conventionally provided in the stage succeeding to the detector 12, thereby reducing the number of the components of the MSK signal demodulation circuit.

For shifting the phase of the rectangular wave applied from the amplitude 17, the timing determining unit 24 is made a little more complicated than the timing determining unit 18 in the conventional MSK signal demodulation circuit of FIG. 4. However, the circuit necessary for shifting the phase of the rectangular wave can be constituted by a relatively simple known digital circuit or the like. Therefore, the addition of the function of shifting the phase of the rectangular wave to the timing determining unit 24 does not involve a considerable increase of the number of the components in the MSK signal demodulation circuit nor an increase in cost.

By adding the function of shifting the phase of the rectangular wave to the timing determining unit 24, the present embodiment eliminates the phase difference between the rectangular wave output by the amplitude discrimination unit 17 and the clock signal applied to the timing determining unit 24, which difference is caused due to the use of the output signal of the multiplier 13 as the reference signal of the clock reproduction circuit 20. However, the method of eliminating the phase difference is not limited thereto.

Figure 2:
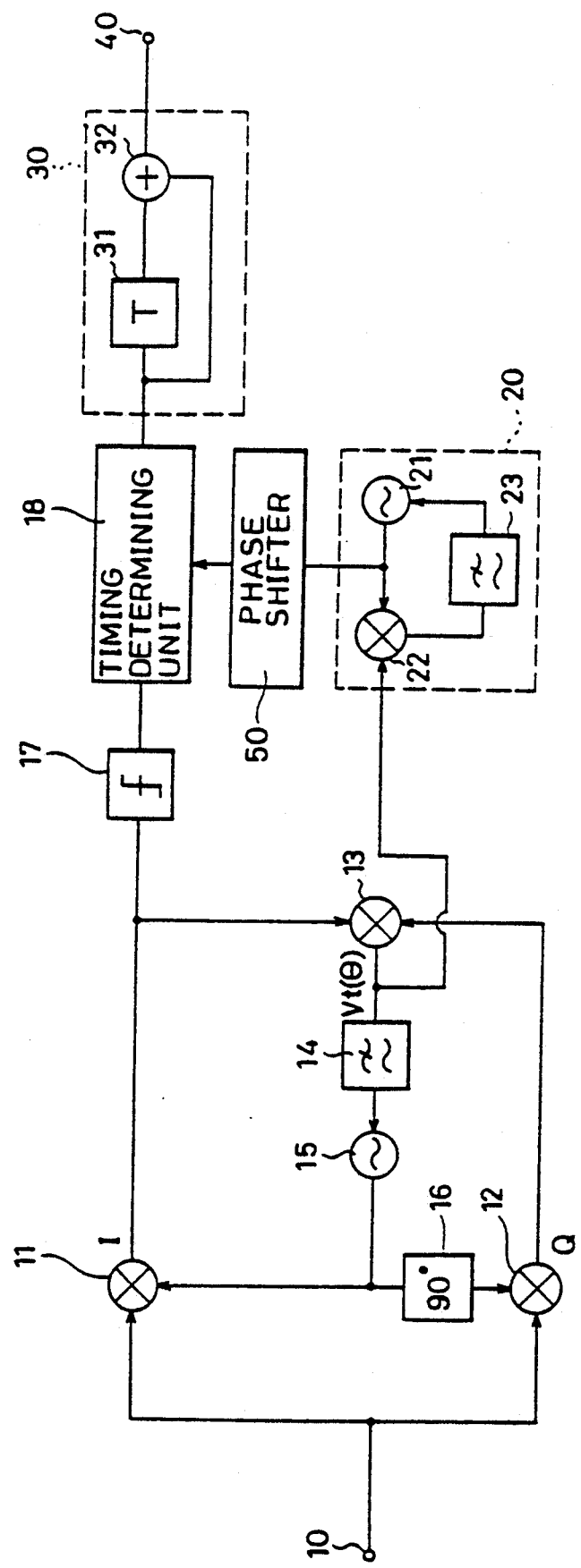
FIG. 2 is a block diagram showing the structure of an MSK signal demodulation circuit according to another embodiment of the present invention.

For example, a circuit 50 can be provided between the voltage-controlled clock oscillator 21 and the timing determining unit 18 as shown in FIG. 2 in order to shift the phase of the output signal of the voltage-controlled clock oscillator 21 by 90° as indicated by the broken line in (f) of FIG. 3.

While the foregoing description is made with the mark frequency fm as the center frequency of the output signal of the voltage-controlled carrier oscillator 15, the same circuit operation causes the output terminal 40 to output the digital data before being modulated also with the space frequency fs used as the center frequency of the output signal of the voltage-controlled carrier oscillator 15.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A demodulation device for demodulating a modulated signal obtained by modulating digital data by minimum shift keying, said modulated signal including a signal component having a frequency corresponding to one-bit duration of said digital data, comprising:
   first detecting means for detecting said modulated signal synchronously with a first signal,
   second detecting means for detecting said modulated signal synchronously with a second signal,
   the phase of said first signal and the phase of said second signal differing from each other by 90°,
   multiplying means for multiplying the output of said first detecting means by the output of said second detecting means, clock signal generating means responsive to the multiplication output of said multiplying means for generating a clock signal having a phase synchronized with that of said signal component, and means responsive to the clock signal generated by said clock signal generating means for reproducing said digital data from the output of said first detecting means, wherein said reproducing means includes:

first phase shifting means for shifting the phase of said generated clock signal by 90°, amplitude discriminating means for outputting a signal of a first logical level when the amplitude of the output signal of said first detecting means is within a predetermined range and outputting a signal of a second logical level when said amplitude is out of said predetermined range, and sampling means responsive to the clock signal having the phase shifted by said first phase shifting means for sampling the output signal of said amplitude discriminating means.

2. The demodulation device according to claim 1, wherein said clock signal generating means includes:

first oscillator means having a variable output frequency, third detecting means responsive to the output of said multiplying means for detecting the phase of the output signal of said first oscillator means, and first controlling means responsive to the output signal of said third detecting means for controlling the output frequency of said first oscillator means.

3. The demodulation device according to claim 2, further comprising:

second controlling means responsive to the output of said multiplying means for generating a control signal, second oscillator means for generating said first signal having a frequency corresponding to said control signal, and second phase shifting means for shifting the phase of the output signal of said second oscillator means by 90° to generate said second signal.

4. The demodulation device according to claim 3, wherein said digital data includes first and second logical values, said modulated signal has a first frequency and a second frequency respectively corresponding to said first and second logical values, and the center frequency of the output signal of said second oscillator means is said first frequency.

5. The demodulation device according to claim 1, wherein said digital data is differentially coded in advance, and said reproducing means further includes:

means for delaying said sampled signal by a time period equivalent to said one-bit duration, and means for producing an exclusive OR signal of the output signal of said delaying means and said sampled signal.

6. A demodulation device for demodulating a modulated signal obtained by modulating differentially coded digital data by minimum shift keying, said modulated signal including a signal component having a frequency corresponding to one-bit duration of said digital data, comprising:

first detecting means for detecting said modulated signal synchronously with a first signal, second detecting means for detecting said modulated signal synchronously with a second signal, the phase of said first signal and the phase of said second signal differing from each other by 90°, multiplying means for multiplying the output of said first detecting means by the output of said second detecting means, clock signal generating means responsive to the multiplication output of said multiplying means for generating a clock signal having a phase synchronized with that of said signal component, and means responsive to the clock signal generated by said clock signal generating means for reproducing said digital data from the output of said first detecting means, wherein said reproducing means further includes:

means for delaying said sampled signal by a time period equivalent to said one-bit duration, and means for generating an exclusive OR signal of the output signal of said delaying means and said sampled signal.

7. A demodulation device for demodulating a modulated signal obtained by modulating digital data by minimum shift keying, said modulated signal including a signal component having a frequency corresponding to one-bit duration of said digital data, comprising:

first detecting means for detecting said modulated signal synchronously with a first signal, second detecting means for detecting said modulated signal synchronously with a second signal, the phase of said first signal and the phase of said second signal differing from each other by 90°, multiplying means for multiplying the output of said first detecting means by the output of said second detecting means, clock signal generating means responsive to the multiplication output of said multiplying means for generating a clock signal having a phase synchronized with that of said signal component, and means responsive to the clock signal generated by said clock signal generating means for reproducing said digital data from the output of said first detecting means, wherein said reproducing means includes:

amplitude discriminating means for outputting a signal of a first logical level when the amplitude of the output signal of said first detecting means is within a predetermined range and outputting a signal of a second logical level when said amplitude is out of said predetermined range, and means for shifting the phase of the output signal of said amplitude discriminating means by 90° and sampling said signal having the phase shifted in response to said generated clock signal.

8. The demodulation device according to claim 7, wherein said clock signal generating means includes:

first oscillator means having a variable output frequency, third detecting means responsive to the output of said multiplying means for detecting the phase of the output signal of said first oscillator means, and first controlling means responsive to the output signal of said third detecting means for controlling the output frequency of said first oscillator means.

9. The demodulation device according to claim 8, further comprising:

second controlling means responsive to the output of said multiplying means for generating a control signal, second oscillator means for generating said first signal having a frequency corresponding to said control signal, and second phase shifting means for shifting the phase of the output signal of said second oscillator means by 90° to generate said second signal.

10. The demodulation device according to claim 9, wherein said digital data includes first and second logical values, said modulated signal has a first frequency and a second frequency respectively corresponding to said first and second logical values, and the center frequency of the output signal of said second oscillator means is said first frequency.

11. A method for demodulating a modulated signal obtained by modulating digital data by minimum shift keying, said modulated signal including a signal component having a frequency corresponding to one-bit duration of said digital data, said method comprising the steps of:

detecting said modulated signal synchronously with a first signal, detecting said modulated signal synchronously with a second signal having a phase different by 90° from the phase of said first signal, multiplying said signal detected synchronously with the first signal by said signal detected synchronously with the second signal, generating a clock signal having the phase synchronized with said signal component in response to said multiplied signal, and reproducing said digital data from said signal detected synchronously with the first signal in response to said generated clock signal, said reproducing step comprising the steps of:

shifting the phase of said generated clock signal by 90°, converting said signal detected synchronously with the first signal into a signal having a logical level varying corresponding to the change of the amplitude of said signal detected synchronously with the first signal, and sampling said converted signal in response to said clock signal having the phase shifted.

12. A method for demodulating a modulated signal obtained by modulating digital data by minimum shift keying, said modulated signal including a signal component having a frequency corresponding to one-bit duration of said digital data, said method comprising the steps of:

detecting said modulated signal synchronously with a first signal, detecting said modulated signal synchronously with a second signal having a phase different by 90° from the phase of said first signal, multiplying said signal detected synchronously with the first signal by said signal detected synchronously with the second signal, generating a clock signal having the phase synchronized with said signal component in response to said multiplied signal, and reproducing said digital data from said signal detected synchronously with the first signal in response to said generated clock signal, said reproducing step comprising the steps of:

converting said signal detected synchronously with the first signal into a signal having a logical level varying corresponding to the change of the amplitude of said signal detected synchronously with the first signal, shifting the phase of said converted signal by 90°, and sampling said signal having the phase shifted in response to said generated clock signal.

* * * * *